Sept. 23, 1924.
L. W. BATES ET AL
1,509,630
HEAT DEFLECTOR FOR GAS BURNERS
Filed March 7, 1923
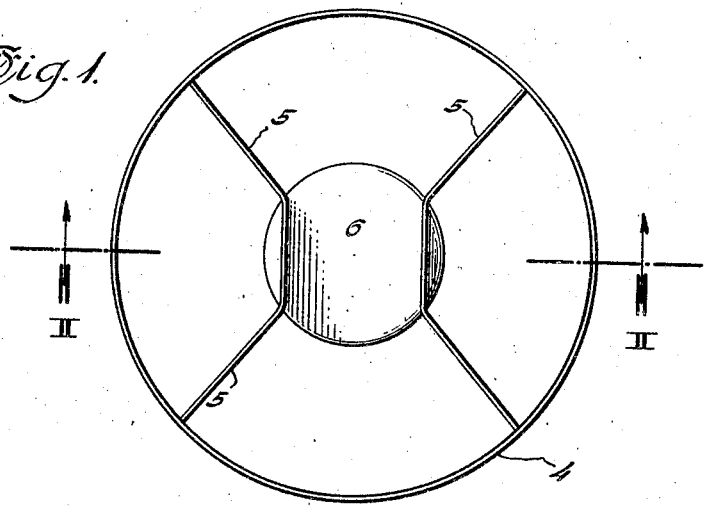
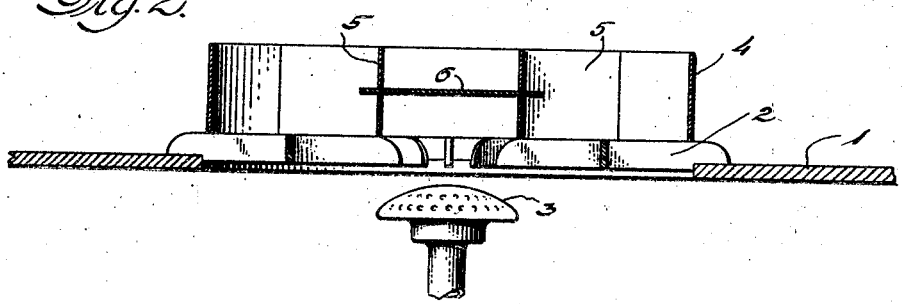
Inventors:
Lloyd W. Bates
Ezra N. Traut
By
Attorneys Patented Sept. 23, 1924.

1,509,630

UNITED STATES PATENT OFFICE.

LLOYD W. BATES AND EZRA H. TRAUT, OF DETROIT, MICHIGAN.

HEAT DEFLECTOR FOR GAS BURNERS.

Application filed March 7, 1923. Serial No. 623,362.

*To all whom it may concern:*

Be it known that we, LLOYD W. BATES and EZRA H. TRAUT, citizens of the United States of America, residing at Detroit, in the county of Wayne and State of Michigan, have invented certain new and useful Improvements in Heat-Deflectors for Gas Burners, of which the following is a specification, reference being had therein to the accompanying drawings.

In the construction of cooking stoves and the like, employing gas burners as a means for heating, the supports for the cooking or other utensils are usually arranged so that the utensil is supported directly above the burner and the flames from the burner impinge directly upon the bottom of the utensil at the center thereof with a consequent of heating and destruction of the central portion of the bottom of the utensil. Attempts have been made to overcome this defect by providing a deflecting plate or the like directly over the burner and upon which plate the utensil is seated, but this arrangement prevents quick and proper heating of the contents of the utensil at the center thereof as the heat must penetrate not only the deflector, but also the bottom of the utensil.

The object of the present invention is to overcome the difficulties inherent in present constructions by providing means whereby the direct burner flames are deflected and prevented from impinging directly upon the bottom of the utensil, but are permitted to contact said bottom throughout its entire area, thus giving an even distribution of heat over the bottom of the utensil and preventing destruction of the utensil bottom by direct impingement of flames thereagainst.

It is also an object of the invention to provide a construction wherein the flames are confined to an area substantially equal to that of the area of the bottom of the utensil, thus concentrating the heat and increasing the efficiency of the heater.

It is also an object to provide certain other new and useful features in the construction and arrangement of parts, all as hereinafter more fully described.

With the above and other ends in view, the invention consists in the matters hereinafter set forth and more particularly pointed out in the appended claims, reference being had to the accompanying drawing, in which—

Figure 1 is a plan view of an attachment for gas stoves, embodying the invention;

Fig. 2 is a transverse vertical section upon the line II—II of Fig. 1, and showing the device illustrated in Fig. 1 in operative position relative to a burner and grid of a heater;

As shown in the drawing, 1 indicates the top of an ordinary gas stove which top has an opening therein, and spanning this opening is the usual grid 2 for supporting cooking utensils directly above the burner 3.

The device embodying the present invention comprises a circular sheet metal wall 4 with transverse partitions 5 extending across within this circular wall and forming supports for a central disk or deflecting plate 6, said deflecting plate being positioned midway of the height of the outer wall or ring 4 and also of the height of the transverse walls 5. The device is adapted to be placed upon the usual grid 2 for the support of a cooking utensil which is placed thereon, resting upon the upper edges of the walls 4 and 5. With this arrangement the cooking utensil is supported directly above the burner 3, but the flames issuing from the burner are prevented from impinging directly upon the bottom of the cooking utensil, these flames being deflected laterally by the plate 6 and then permitted to pass around the edges of this plate and inwardly between the plate and the bottom of the cooking utensil. The heating flames are thus distributed over the entire surface of the cooking utensil, but are prevented from impinging directly thereon at any particular spot so that the utensil will be injured thereby.

When the cooking utensil is in place upon the device shown in the drawing, it rests directly upon the upper edges of the walls 4 and 5, and the outer annular wall 4 serves to confine the flames and prevent their escape upwardly along the outside of the cooking utensil.

This invention may be developed within the scope of the appended claims, and we do not therefore limit ourselves to the particular construction shown.

Having thus fully described our invention, what we claim is:

1. A device for the purpose described comprising a utensil supporting member adapted to be supported above a gas burner, said member including a central deflecting plate intermediate of the height of said supporting member and spaced from the upper horizontal surface of the member which forms a seat for the utensil.

2. A device for the purpose described comprising an annular outer upstanding wall and members extending inwardly from said wall, the upper edges of said wall and members forming a supporting surface for the bottom of a cooking utensil, and a central deflecting member carried above the base of said wall by the inwardly extending members and below the upper utensil supporting surface of said members.

3. A device for the purpose described comprising an outer annular wall formed of sheet metal, transverse walls connected to the outer annular wall and extending inwardly therefrom and extending to the proximity of the top of said wall, and a disk-like deflecting plate substantially smaller than the inner diameter of said annular wall carried by said inwardly extending walls and positioned axially within the outer annular wall at a height above the base of said annular wall and with a space between its upper surface and the horizontal plane of the upper edge surfaces of the annular wall and inwardly extending walls.

In testimony whereof we affix our signatures in the presence of two witnesses.

LLOYD W. BATES.
EZRA H. TRAUT.

Witnesses:
 LEWIS E. FLANDERS,
 ANNA M. DORR.